United States Patent
Hegarty et al.

(10) Patent No.: US 11,366,657 B2
(45) Date of Patent: *Jun. 21, 2022

(54) INFERRING CODE DEPRECATION FROM MODULE DEPRECATION

(71) Applicant: Oracle International Corporation, Redwood Shores, CA (US)

(72) Inventors: Chris Hegarty, Dublin (IE); Alexander R. Buckley, Cupertino, CA (US); Stuart Warren Marks, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,377

(22) Filed: Apr. 23, 2020

(65) Prior Publication Data

US 2020/0249940 A1 Aug. 6, 2020

Related U.S. Application Data

(63) Continuation of application No. 15/830,241, filed on Dec. 4, 2017, now Pat. No. 10,671,383.

(51) Int. Cl.
*G06F 8/71* (2018.01)
*G06F 8/41* (2018.01)
*G06F 11/36* (2006.01)
*G06F 8/75* (2018.01)

(52) U.S. Cl.
CPC ............... *G06F 8/71* (2013.01); *G06F 8/41* (2013.01); *G06F 8/75* (2013.01); *G06F 11/3604* (2013.01)

(58) Field of Classification Search
CPC .......... G06F 8/71; G06F 8/41; G06F 11/3604
USPC ........................................................ 717/121
See application file for complete search history.

(56) References Cited

U.S. PATENT DOCUMENTS

| | | | |
|---|---|---|---|
| 8,935,663 B2 * | 1/2015 | Tiwari | G06F 8/75 717/116 |
| 10,235,527 B1 * | 3/2019 | Dalessio | G06F 16/2379 |
| 2009/0049065 A1 * | 2/2009 | Weissman | G06F 8/71 |
| 2010/0153862 A1 * | 6/2010 | Schreiber | G06Q 30/0273 715/760 |
| 2012/0222025 A1 * | 8/2012 | Pandit | G06F 8/658 717/170 |
| 2013/0055211 A1 * | 2/2013 | Fosback | G06F 8/75 717/126 |
| 2013/0205279 A1 * | 8/2013 | Osminer | G06F 8/73 717/123 |
| 2013/0254745 A1 * | 9/2013 | Tiwari | G06F 8/75 717/124 |
| 2013/0275943 A1 * | 10/2013 | Namjoshi | G06F 8/75 717/122 |

(Continued)

*Primary Examiner* — Lewis A Bullock, Jr.
*Assistant Examiner* — Theodore E Hebert
(74) *Attorney, Agent, or Firm* — Invoke

(57) ABSTRACT

Techniques for inferring code deprecation from module deprecation are disclosed. A system detects a reference to a type. The system determines that a particular module, in a plurality of modules in a module system, exposes the referenced type. The system determines that the particular module is associated with a deprecation status. Responsive to determining that the particular module is associated with the deprecation status, the system presents information indicating that the reference references a deprecated module.

20 Claims, 10 Drawing Sheets

(56) References Cited

U.S. PATENT DOCUMENTS

| | | | |
|---|---|---|---|
| 2014/0032610 A1* | 1/2014 | Kemmler | G06F 16/213 |
| | | | 707/803 |
| 2016/0154829 A1* | 6/2016 | Schrum | G06F 16/2365 |
| | | | 707/703 |
| 2017/0010888 A1* | 1/2017 | Grushko | G06F 8/33 |
| 2018/0018149 A1* | 1/2018 | Cook | G06F 8/70 |
| 2019/0138424 A1* | 5/2019 | Vanderwerff | G06F 11/362 |

* cited by examiner

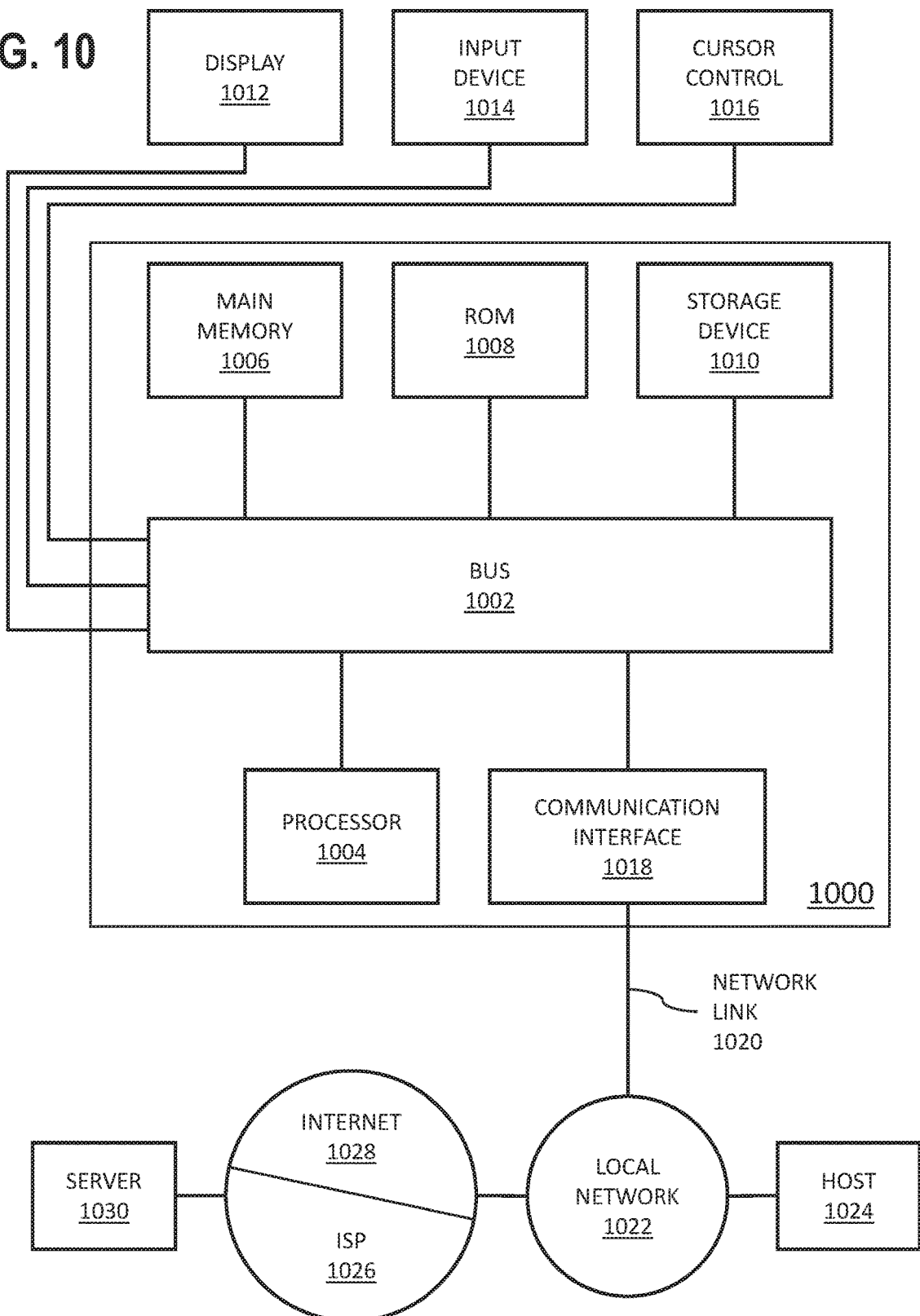

US 11,366,657 B2

INFERRING CODE DEPRECATION FROM MODULE DEPRECATION

INCORPORATION BY REFERENCE; DISCLAIMER

The following application is hereby incorporated by reference: application Ser. No. 15/830,241 filed on Dec. 4, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to modules. In particular, the present disclosure relates to module deprecation.

BACKGROUND

In computer programming, a code is considered deprecated when other code (a "consumer") is formally discouraged from using the deprecated code. Code may be deprecated for many different reasons. The deprecated code may suffer from a security vulnerability, poor performance, failure to adhere to a design standard, or some other flaw. The deprecated code may be considered extraneous and/or disfavored relative to other code that is available. The deprecated code may belong to a larger set of code that is slated for a redesign. The deprecated code may be approaching a point in time after which the deprecated code will no longer be supported by a developer (sometimes referred to as "end of life"). At some point, deprecated code may be removed from a system entirely. Deprecated code may be removed from a system in the course of an upgrade to a new version that omits the deprecated code, or in some other way. When deprecated code is removed from a system, other code that relies on the deprecated code may become unreliable, degraded, or inoperable. The other code may fail to compile or execute entirely. Accordingly, when code is deprecated, developers of other code may seek to avoid relying on the deprecated code as soon as reasonably possible.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
   2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
   2.4 MODULE AND NON-MODULE ENVIRONMENTS
   2.5 DEVELOPMENT ENVIRONMENT EXAMPLE
   2.6 GENERATING AN AUTOMATIC MODULE
   3. INFERRING CODE DEPRECATION FROM MODULE DEPRECATION
   3.1 INFERRING DEPRECATION OF NON-MODULE CODE
   3.2 INFERRING DEPRECATION OF MODULE CODE
   4. MISCELLANEOUS; EXTENSIONS
   5. HARDWARE OVERVIEW
   6. COMPUTER NETWORKS AND CLOUD NETWORKS
   7. MICROSERVICE APPLICATIONS

1. General Overview

One or more embodiments include techniques for inferring code deprecation from module deprecation. A system detects a reference to a type. The system determines that a particular module, in a plurality of modules in a module system, exposes the referenced type. The system determines that the particular module is associated with a deprecation status. Responsive to determining that the particular module is associated with the deprecation status, the system presents information indicating that the reference references deprecated code. The information may indicate, for example, that the reference references a deprecated module. The information may indicate, for example, that the referenced type is a deprecated type responsive to determining that the referenced type is exposed by a deprecated module.

One or more embodiments described in this Specification and/or recited in the claims may not be included in this General Overview section.

2. Architectural Overview

Figure 1:
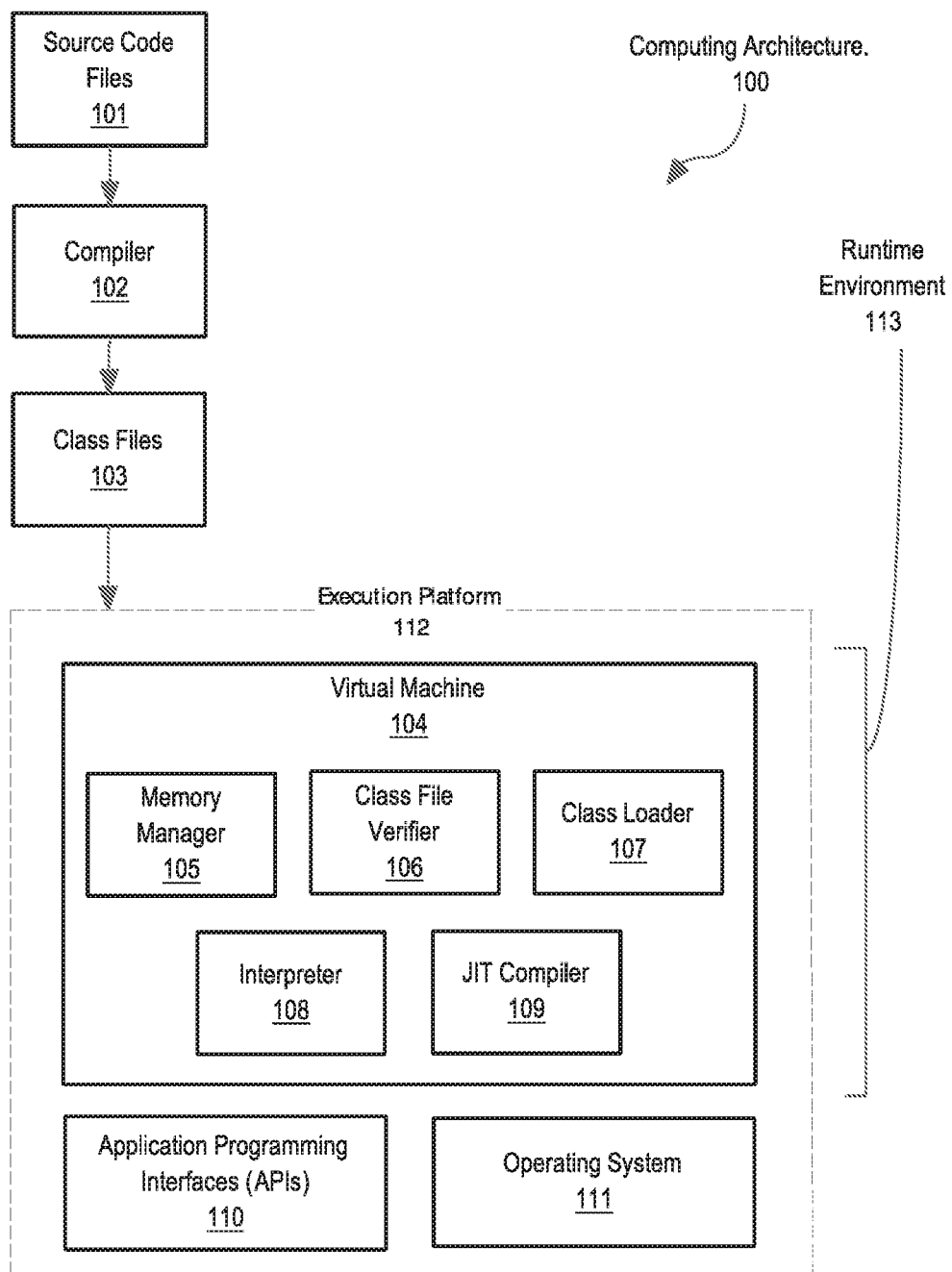
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
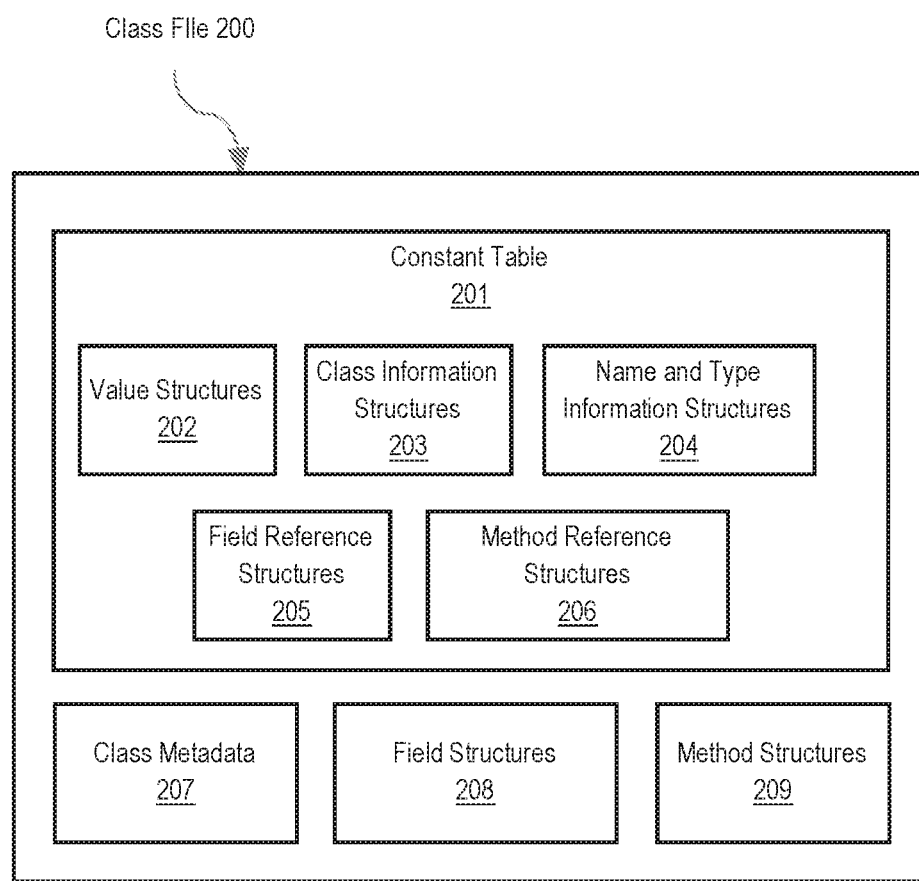
FIG. 2 is a block diagram illustrating an embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
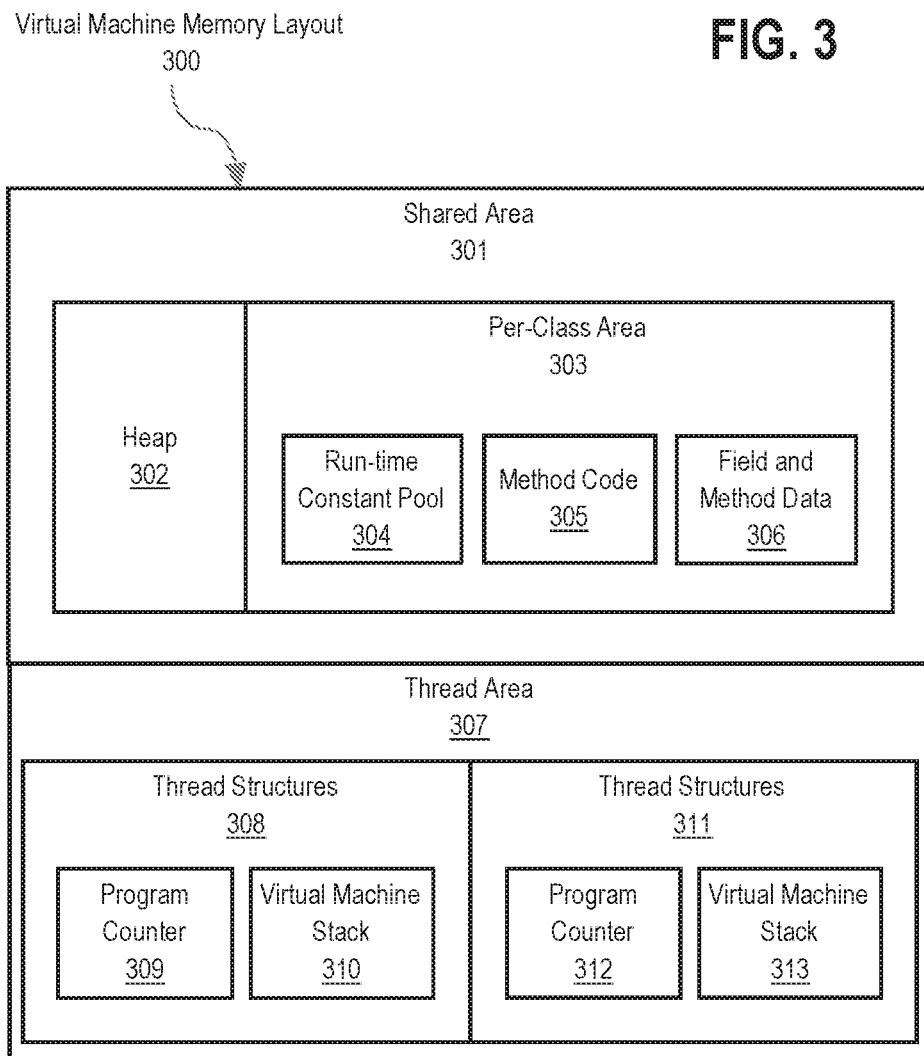
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
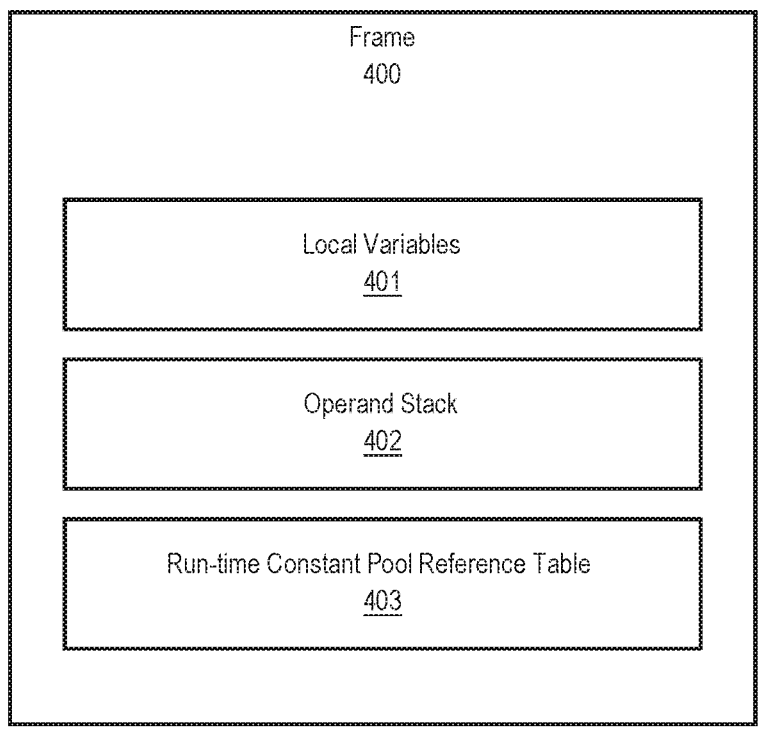
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded).

Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

2.4 Module and Non-Module Environments

Computing platforms for developing and maintaining software generally rely on one of two kinds of systems: non-module systems and module systems.

A non-module system refers to a system in which dependencies between different pieces of code are not strictly declared or restricted. An industry-defined term "JAR hell" refers to example uses of Java Archive (JAR) files in a non-module system which result in problems, for example, with the class loading process.

A module system includes a collection of named modules and defines how the collection of named modules work together. Each particular named module in the collection of named modules may explicitly define dependencies on other named modules (or the contents thereof). However, named modules are typically restricted from explicitly depending on any non-module code.

Figure 5:
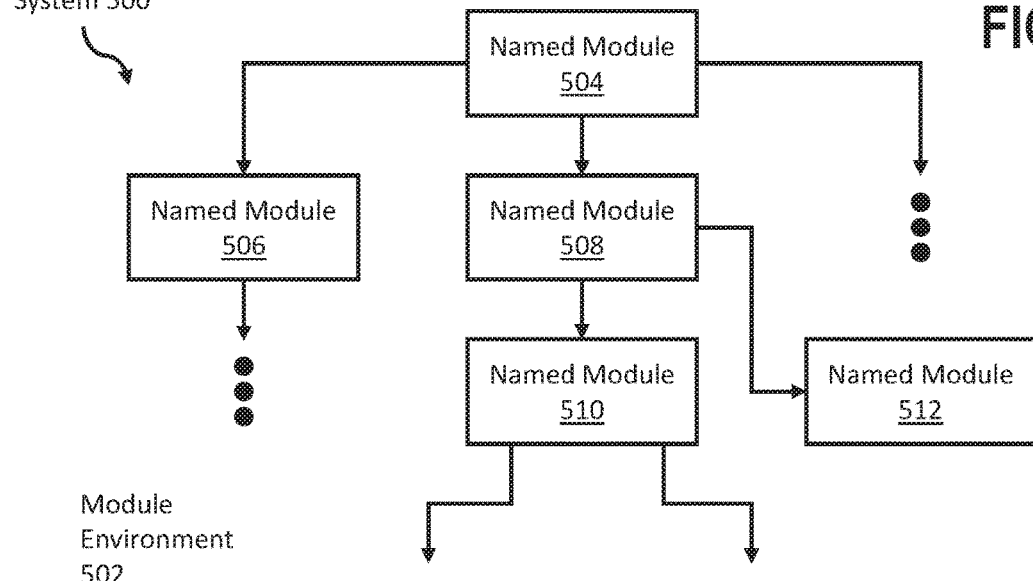
FIG. 5 illustrates a system in block diagram form in accordance with one or more embodiments.
Figure 5:
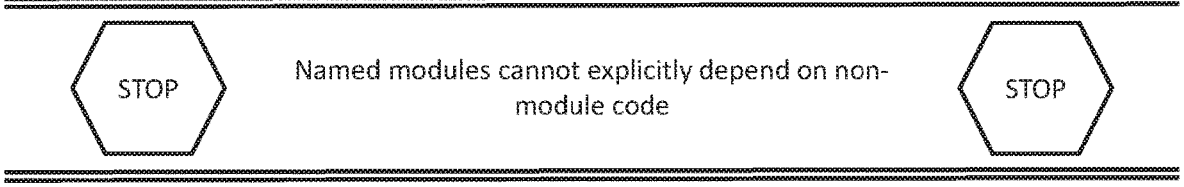
Figure 5:
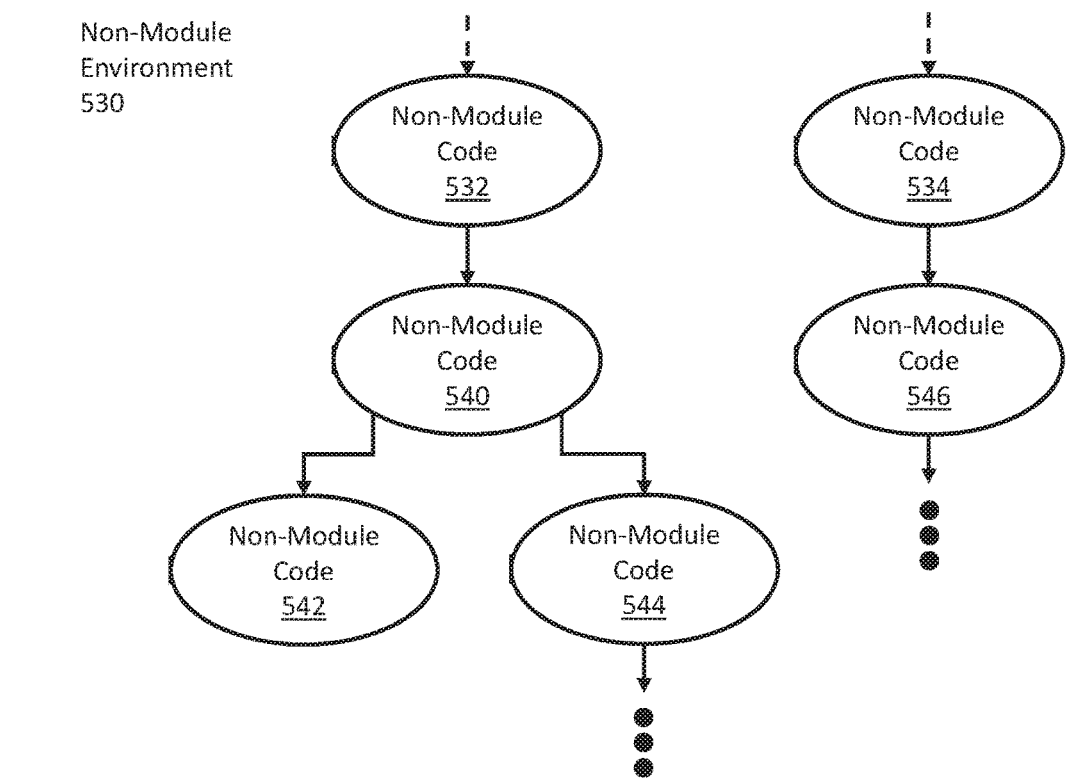

FIG. 5 illustrates a system in accordance with one or more embodiments. Other embodiments may include more or fewer devices and more or fewer components than illustrated in the systems and/or described below. Hardware components, software components, and/or functionality described as corresponding to one device may instead correspond to another device. Components illustrated separately may be combined into a single component or implemented on a single device. Accordingly, the scope of the claims should not be construed as being limited by the specific examples herein.

As illustrated in FIG. 5, a system 500 includes components of a module environment 502. The system 500 may also include components of a non-module environment 530.

For illustrative purposes, the following discussion assumes that the system 500 includes both a module environment 502 and a non-module environment 530. In an embodiment, the system 500 does not include a non-module environment 530.

The non-module environment 530 includes non-module code 532-546. Dependencies between different non-module code are not required to be explicitly declared. Accordingly, when a first non-module code depends on a second non-module code, the software development environment must search for the second non-module code in all files of a set of files associated with all of the code. The dependencies between different non-module code (which may not be explicitly declared) are illustrated in FIG. 5 using arrows. For example, the dependency of non-module code 532 on non-module code 540 is illustrated using an arrow beginning at non-module code 532 and ending at non-module code 540. Furthermore, a dependency of non-module code 540 on non-module code 542 and non-module code 544 is illustrated using two arrows beginning at non-module code 540 and ending at non-module code 542 and non-module code 544, respectively.

The module environment 502 includes a set of named modules (e.g., named modules 504-512). Dependencies between different named modules in a module environment, such as module environment 502, are explicitly declared by the modules. An explicitly declared dependency may be referred to herein as an "explicit dependency." The explicit dependencies between different named modules (or contents thereof) in module environment 502 are also illustrated using arrows. For example, the explicit dependency of named module 504 on named module 508 is illustrated using an arrow starting at named module 504 and ending at named module 508. Further, the explicit dependency of named module 508 on named module 510 is illustrated using an arrow starting at named module 508 and ending at named module 510.

As illustrated in FIG. 5, there is a partition between module environment 502 and non-module environment 530. Specifically, named modules cannot explicitly depend on non-module code. For example, named module 510 cannot explicitly depend on non-module code 532. As a result, module environments comprising named modules cannot be built on top of non-module environments comprising non-module code.

In an embodiment, the system 500 modularizes non-module code to obtain modularized code. Modularizing non-module code to obtain modularized code does not necessarily require any modification of the non-module code itself. Modularizing non-module code to obtain modularized code includes generating data based on the contents of the non-module code. The data associated with the modularized code is indicated in a module descriptor naming an "automatic" or "bridge" module associated with the modularized code. The module descriptor is used for exposing (for example, by exporting) the packages of the modularized code for access by other modules or non-module code. Furthermore, the module descriptor of an automatic module may include an explicit dependency on a dependency path corresponding to non-module code without exposing the non-module code. Alternatively or in addition, the module descriptor may include an explicit dependency on a particular module considered a "core" module. Alternatively or in addition, the module descriptor may expose non-module code. Modularization of non-module code is described in further detail in U.S. patent application Ser. No. 14/808,689, entitled "Bridging a Module System and a Non-Module System," filed Jul. 24, 2015 and having a common assignee as the present document.

3. Inferring Code Deprecation From Module Deprecation

In an embodiment, a module may be deprecated. A deprecated module is a module with a deprecation status. The deprecation status of a module is intended to discourage a developer from writing code that depends on the deprecated module. A module may be deprecated for many different reasons. The deprecated module may suffer from a security vulnerability, poor performance, failure to adhere to a design standard, or some other flaw. The deprecated module may be considered extraneous and/or disfavored relative to other code (e.g., another module) that is available. The deprecated module may belong to a larger set of code that is slated for a redesign. The deprecated module may be approaching a point in time after which the deprecated module will no longer be supported by a developer (sometimes referred to as "end of life"). At some point, a deprecated module may be removed from a system entirely. However, as long as a deprecated module remains available for use in a system, the module may continue to function as normal. Code outside the deprecated module may continue to use types from the deprecated module as normal. However, the deprecated module may continue to suffer from a security vulnerability, poor performance, failure to adhere to a design standard, or some other flaw. The system may issue warnings to developers who write code that depends on the deprecated module.

A particular module's deprecation status may be indicated in many different ways. In the following discussion, examples are provided using annotations in the Java programming language. Deprecation statuses may be included in many different programming languages, and may be indicated in ways other than annotations. Examples using annotations in the Java programming language are provided for illustrative purposes only and should not be construed as limiting one or more embodiments.

In an embodiment, a module's deprecation status is indicated by an annotation in a module descriptor associated with that module, according to a predefined syntax. A module descriptor stores a declaration of a particular module, indicating information such as the module's name, members of the module that are exposed for use by code outside the module, and/or other modules on which the module depends. Alternatively or in addition, a module descriptor may store metadata associated with the module, such as annotations that indicate a deprecation status of the module and/or other statuses. In the Java programming language, a file named "module-info.java" includes the module declaration for a particular module. An "@Deprecated" annotation in a "module-info.java" file indicates that the declared module is deprecated. The lack of an "@Deprecated" annotation in a "module-info.java" file indicates that the declared module is not deprecated. For compiled byte code, information about a module may be stored in module descriptor named "module-info.class."

In an embodiment, one or more parameters may be used to supply additional information about a deprecation status, such as a kind of deprecation, a history of the deprecation status, etc. The Java programming language allows two kinds of deprecation: ordinary deprecation and terminal deprecation. Ordinary deprecation indicates that a module should not be used, even though the module may not be removed in the near future. Terminal deprecation indicates that a module should not be used and will deliberately be removed in the near future. A "forRemoval" parameter may be included in a deprecation annotation to denote ordinary deprecation or ordinary deprecation. "@Deprecated (forRemoval=true)" indicates terminal deprecation, while "@Deprecated(forRemoval=false)" indicates ordinary deprecation. In the absence of a "forRemoval" parameter, the module may be assumed to have ordinary deprecation. A "since" parameter may be used to indicate a version at which the module became deprecated. The annotation "@Deprecated(since=9)" indicates that the module has been deprecated since version 9. The parameters associated with a deprecation status may change from one version of a module to the next. For example, to change a module from ordinary deprecation to terminal deprecation, the "forRemoval=true" parameter may be added.

In an embodiment, when code declares an explicit dependency on a deprecated module, a warning is generated. Specifically, an integrated development environment (IDE), compiler, and/or runtime environment may be configured to raise a warning upon encountering code that uses a deprecated module, such as when code declares an explicit dependency on a deprecated module. A system may support disabling such warnings. Disabling a warning about ordinary deprecation may be done in the same manner or a different manner than disabling a warning about terminal deprecation. Due to the seriousness of terminal deprecation, the Java programming language specifies that disabling a warning about terminal deprecation is not done in the same manner as disabling a warning about ordinary deprecation. Code that declares an explicit dependency on a deprecated module may itself be considered deprecated, by virtue of the dependency. In the Java programming language, code may declare an explicit dependency on a particular module by using a "requires" clause naming that particular module.

In an embodiment, as discussed below, an IDE, compiler, debugging tool, runtime environment, and/or any other component of a system or combination thereof, may infer code deprecation based on module deprecation, even in situations where the code does not declare an explicit dependency on the deprecated module.

3.1 Inferring Deprecation of Non-Module Code

Figure 6A:
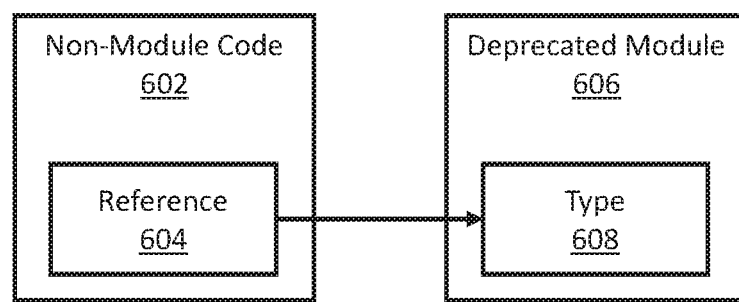
FIGS. 6A-6B illustrate an example in accordance with an embodiment.
Figure 6B:
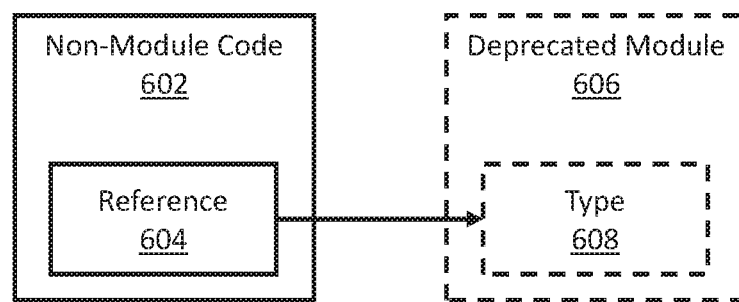

In an embodiment, non-module code may depend on a particular module without explicitly declaring a dependency on the module. FIGS. 6A-6B illustrate an example in accordance with an embodiment. The illustrations in FIGS. 6A-6B are provided for exemplary purposes only, and should not be construed as limiting one or more embodiments. As illustrated in FIG. 6A, non-module code 602 includes a reference 604 to a type 608 exposed by a deprecated module 606. Because the type 608 is in a deprecated module 606, the type 608 also may be considered deprecated by inference. Non-module code 602 cannot declare an explicit dependency on the deprecated module 606. An IDE, compiler, debugging tool, or runtime environment cannot rely on explicitly declared dependencies to determine that the reference 604 to the type 608 results in the non-module code 602 depending on the deprecated module 606. As a practical matter, as illustrated in FIG. 6B, the non-module code 602's dependency on the deprecated module 606 means that the non-module code 602 also is deprecated. That is, even though the non-module code 602 is not explicitly declared as deprecated, it depends on code whose use is explicitly discouraged. If the deprecated module 606 is removed from the system, then the type 608 also is removed. The reference 604 to the type 608 is now invalid. The non-module code 602 may now be unreliable, degraded, or inoperable.

Figure 7:
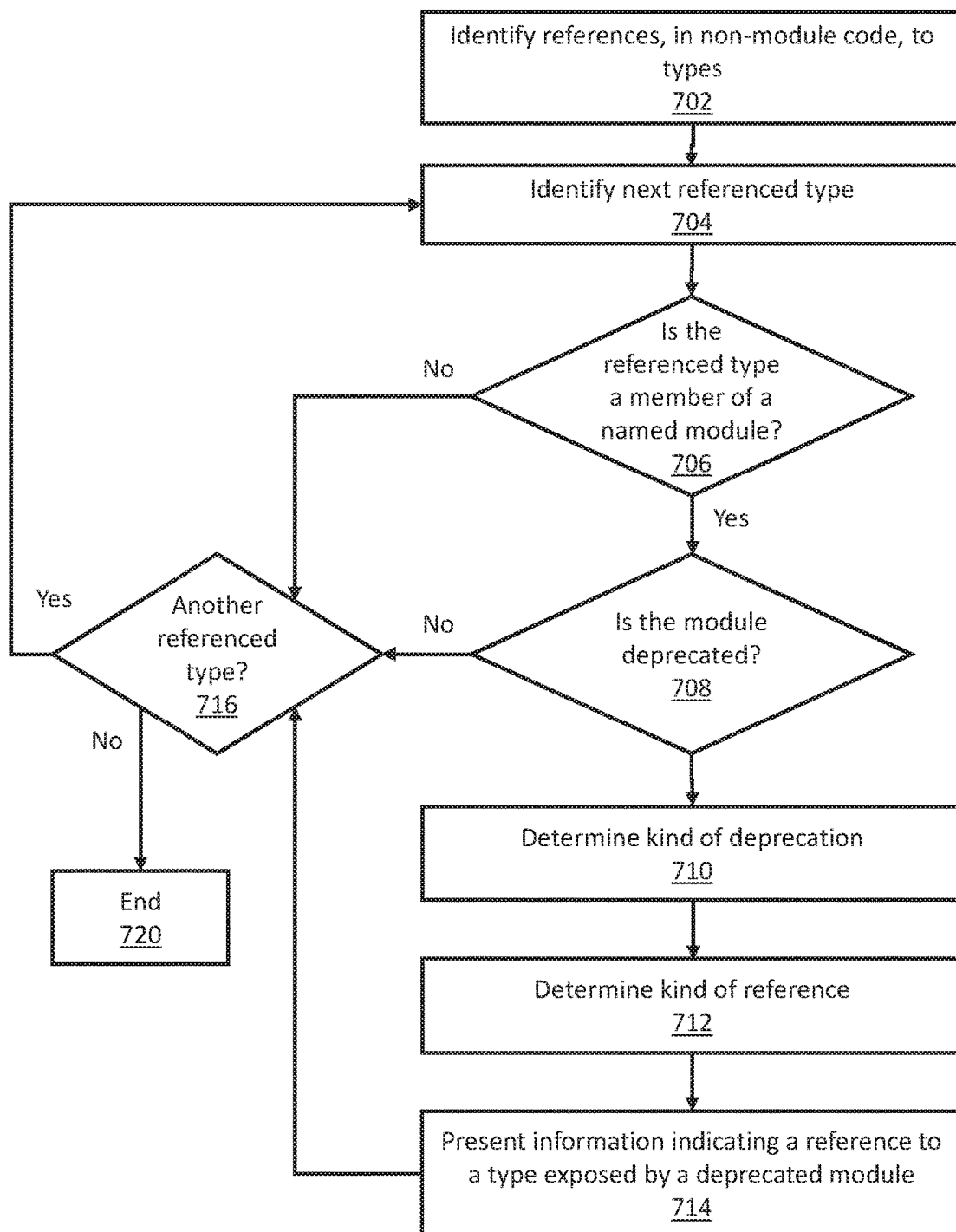
FIG. 7 illustrates a set of operations for inferring code deprecation based on module deprecation in accordance with one or more embodiments.

FIG. 7 illustrates a set of operations for inferring code deprecation based on module deprecation in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments. In the following discussion, reference is made to a system performing various operations. One or more operations described below may be performed by an IDE, compiler, debugging tool, runtime environment, and/or any other component of the system or combination thereof.

In an embodiment, a system identifies references in non-module code to types (Operation 702). A reference to a type may take many different forms. In an example, the non-module code instantiates an object of a particular type. The line(s) of code instantiating the object may be considered a reference to that type. In another example, the non-module code declares a field of a particular type. The line(s) of code declaring the field may be considered a reference to that type. In another example, the non-module code is a subclass of a particular type, i.e., inherits from a superclass of that type. The line(s) of code declaring the inheritance from the superclass may be considered a reference to that type. In another example, non-module code calls a method that returns a value of a particular type. The line(s) of code that call the method may be considered a reference to that type. In another example, the non-module code may use the particular type in an API signature. The non-module code may include a method that receives an object of the particular type as an argument and/or returns an object of the particular type. In addition, a reference to a type may be indirect, as discussed above.

In an embodiment, to identify references in non-module code to types, the system analyzes the non-module code. The system may identify the references to types prior to runtime. Specifically, prior to runtime, the system may analyze the non-module code's source code to identify references to types. Alternatively or in addition, prior to runtime, the system may compile some or all of the non-module code's source code and analyze the compiled code. Alternatively or in addition, the system may identify the references at runtime, by analyzing compiled code that is loaded into a runtime environment. At runtime, the system may perform one or more operations described below when a type in the non-module code is loaded. One or more operations described below may be skipped if a particular type has already been analyzed for deprecation as described below.

A system may analyze non-module code, prior to or during runtime, in many different ways. In an embodiment, to identify references in non-module code to types, the system performs a depth-first or breadth-first traversal of the code (i.e., source code and/or compiled code) to identify references to types. The system may generate a set of references to types before proceeding to analyze the references in the set. Alternatively, the system may perform the following method for one reference before proceeding to identify another reference.

In an embodiment, the system identifies the next referenced type (Operation 704). That is, for a particular reference to a type, the system identifies the particular type that is referenced. The system may obtain information about the referenced type such as whether the type is a member of a named module, whether the type is deprecated, whether a module that includes the type is deprecated, or any other kind of information associated with the referenced type and/or the context in which the type is referenced. As discussed in further detail below, if the referenced type is a member of a named module, the system may traverse a dependency graph to determine whether the named module depends, directly or indirectly, on any deprecated modules.

In an embodiment, the system determines whether the referenced type is a member of a named module (Operation 706). If the referenced type is not a member of a named module (e.g., if the referenced type is in other non-module code), then the system determines whether the non-module code includes another referenced type (Operation 716). If the system includes another referenced type, then the system proceeds to identify the next referenced type (Operation 704). If the system does not include another referenced type, then the method ends (Operation 720).

In an embodiment, if the referenced type is a member of a named module, then the system determines whether the module is deprecated (Operation 708). A system may determine whether a module is deprecated in many different ways. The system may examine a module descriptor to determine whether the corresponding module includes a deprecation annotation, such as @Deprecated as discussed above. At runtime, the module may include one or more methods that supply metadata regarding the module. In the Java programming language, an "isDeprecated( )" method may return a boolean value indicating whether the module is deprecated; a "forRemoval( )" method may return a boolean value indicating whether the module is terminally deprecated; and/or a "since( )" method may return a value corresponding to the first version of the module that was deprecated. If the system is traversing a dependency graph of modules, the system may inspect the module descriptor and/or call a method for multiple modules encountered during the traversal, to help determine whether the non-module code depends, directly or indirectly, on a deprecated module. For purposes of this analysis, even if the module containing the type(s) consumed by the non-module code is not explicitly deprecated, that module may be treated as deprecated if it depends, directly or indirectly, on another module that is explicitly deprecated.

In an embodiment, if the module is not deprecated (either directly or indirectly), then the system determines whether the non-module code includes a reference to another referenced type (Operation 716). If the module is deprecated, then the system may determine the kind of deprecation (Operation 710). The system may determine the kind of deprecation, for example, by inspecting a module descriptor associated with the module and/or calling a "forRemoval( )" method of the module to determine whether the module is terminally deprecated. As discussed below, the system may respond differently to different kinds of deprecation.

In an embodiment, the system determines a kind of reference to the type (Operation 712). As discussed above, a reference to a type may take many different forms. As discussed below, the system may respond differently to different kinds of references.

In an embodiment, the system presents information indicating a reference to a type exposed by deprecated module (Operation 714). In general, exposing a type in a module involves making the type available to code external to the module. The type may be exposed as part of the module's API signature. In the Java programming language, a module may expose a type using an "exports" keyword, an "open" keyword, and/or an "opens" keyword. The system may present information in many different ways. A graphical user interface (GUI) of an IDE may highlight, underline, or otherwise call out the reference to a type exposed by a deprecated module. Alternatively or in addition, the GUI may present a message to a user, such as a dialogue box, pop-up, tooltip, or some other form of message indicating that that code references a type exposed by a deprecated module. A compiler, runtime environment, debugging tool, and/or another component of the system may generate a warning or error message that is presented in a GUI, command line prompt, log file, or any other location where warnings or error messages may be presented. A runtime environment may raise an exception to be handled by runtime code. A system may present information indicating a reference to a type exposed by a deprecated module, before or during runtime, in many different ways.

In an embodiment, the information presented varies depending on the kind of deprecation encountered. For example, if the system supports both ordinary deprecation and terminal deprecation, the different types of deprecation may be handled differently. The system may ignore a reference to a type in an ordinarily deprecated module, or present information of lower priority and/or severity, than if the reference is to a type in a terminally deprecated module. Alternatively or in addition, the system may ignore a reference to a type in a deprecated module, or present information of lower priority and/or severity, if the reference is located in code that is already explicitly deprecated. For example, code in a module A that is explicitly deprecated may reference, directly or indirectly, a type in a module B that is also explicitly deprecated. The system may ignore the reference to the type in module B, or present information of lower priority and/or severity than if module A were not already explicitly deprecated.

In an embodiment, the information presented varies depending on the kind of reference to the type in the deprecated module. The system may treat certain types of references to types in deprecated modules as more serious than other types of references to types in deprecated modules. In an example, non-module code uses a type exposed by a deprecated module as part of an API signature. It may be inferred, from the fact that the type is exposed by a deprecated module, that the non-module code's API signature also is deprecated. By extension, it may be inferred that consumers of the non-module code's API also are deprecated. Due to the cascading effects on other code, a type from a deprecated module appearing in an API signature may be considered more serious than a reference that is internal to the non-module code, i.e., not exposed to other code. An internal reference to a type exposed by a deprecated module may be removed or replaced without altering the non-module code's API signature(s). The system may ignore certain kinds of references that are not deemed sufficiently serious. Alternatively, the system may present information of higher priority and/or severity for kinds of references (e.g., using a type in an API signature) that are considered more serious.

In an embodiment, when a system identifies a reference to a type exposed by a deprecated module, the system may present many different kinds of information. The information presented may include information about the type and/or the module. In an example, a reference at line 3 of non-module source code is to a type "T" exposed by a deprecated module "M." The system may present a warning such as "Warning: line 3 references type T in deprecated module M." Alternatively, in this example, the system may present a less detailed warning such as "Warning: line 3 references a type exposed by a deprecated module." The system may present more or less detailed information. Information that the system presents may include the line(s) of code that reference the type, the type itself, the module that includes the type, the kind of deprecation of the module, the kind of reference to the type, a suggestion for modifying the code, a hyperlink to additional information (e.g., a help page) and/or any other kind of information relevant to a reference to a type exposed by a deprecated module.

3.2 Inferring Deprecation of Module Code

Figure 8A:
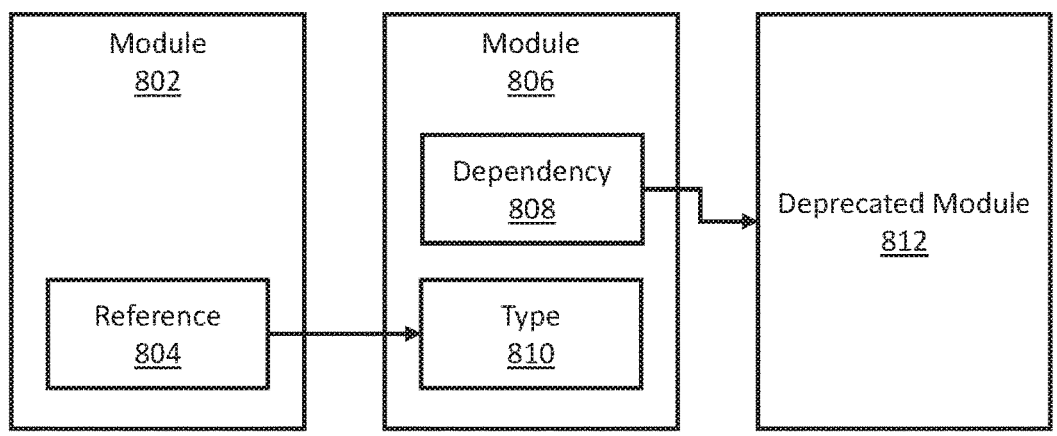
FIGS. 8A-8B illustrate an example in accordance with an embodiment.
Figure 8B:
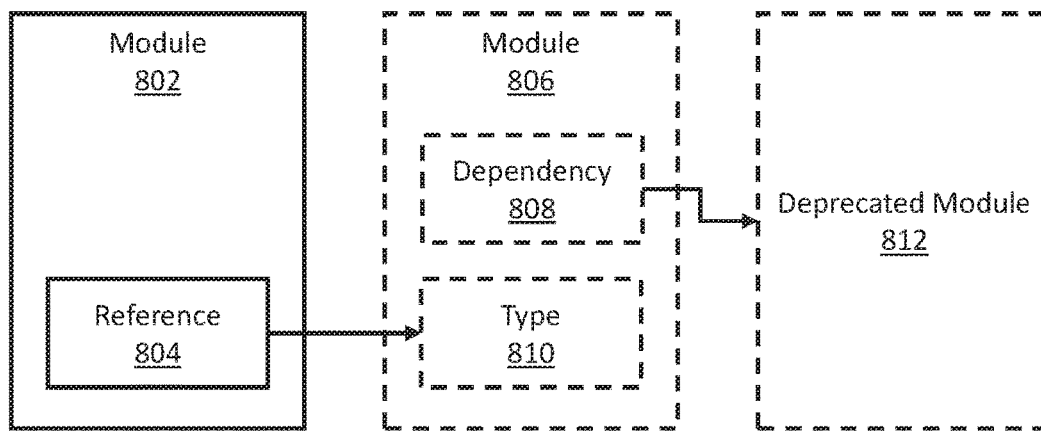

In the discussion above, examples are given of references in non-module code. A reference to a type exposed by a deprecated module may, alternatively or additionally, be found in module code. FIGS. 8A-8B illustrate an example in accordance with an embodiment. The illustrations in FIGS. 8A-8B are provided for exemplary purposes only, and should not be construed as limiting one or more embodiments. As illustrated in FIG. 8A, module 802 includes a reference 804 to a type 810 in module 806. Module 806 is not explicitly deprecated. However, module 806 includes a dependency (e.g., using a "requires" clause) on deprecated module 812. Module 802 depends indirectly on the deprecated module 812. From module 806's dependency on the deprecated module 812, it may be inferred that module 806 also is deprecated. Even though the type 810 is not in the deprecated module 812, the reference 804 may be considered a reference to a type exposed by a deprecated module. The type 810 also may be considered deprecated by inference. As illustrated in FIG. 8B, if the deprecated module 812 is removed from the system, then module 806's dependency 808 on the deprecated module 812 is no longer valid. Module 806 may be degraded, unreliable, and/or inoperable. By association, module 802's reference 804 to the type 810 in module 806 also is no longer valid. Module 802 may be degraded, unreliable, and/or inoperable.

Figure 9:
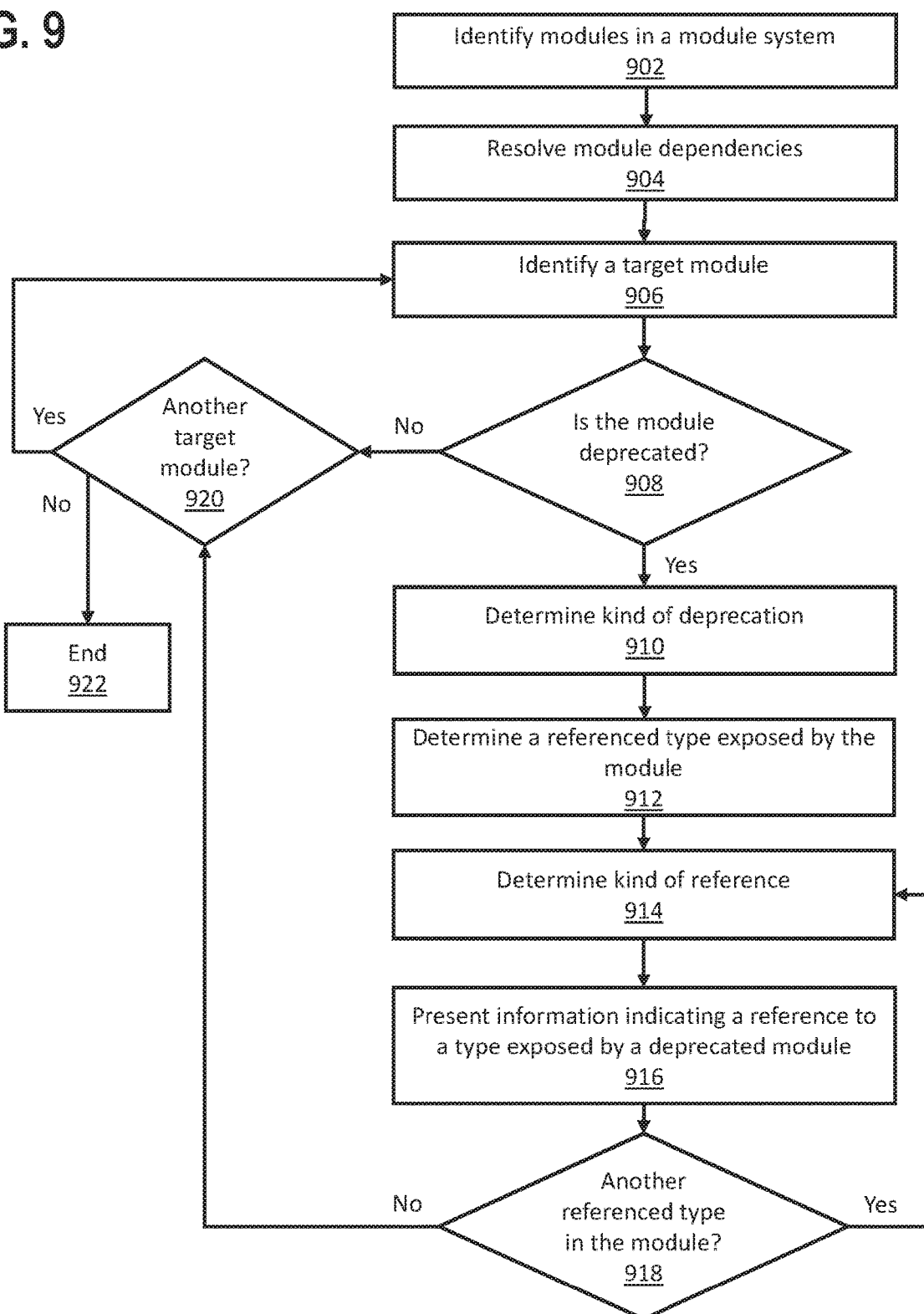
FIG. 9 illustrates a set of operations for inferring code deprecation based on module deprecation in accordance with one or more embodiments.

FIG. 9 illustrates a set of operations for inferring code deprecation based on module deprecation in accordance with one or more embodiments. One or more operations illustrated in FIG. 9 may be modified, rearranged, or omitted all together. Accordingly, the particular sequence of operations illustrated in FIG. 9 should not be construed as limiting the scope of one or more embodiments. In the following discussion, reference is made to a system performing various operations. One or more operations described below may be performed by an IDE, compiler, debugging tool, runtime environment, and/or any other component of the system or combination thereof.

In an embodiment, a system identifies modules in a module system (Operation 902). The system may identify all the modules in the module system or a subset thereof. The modules identified may correspond to all the modules in a particular storage location and/or all the modules loaded into an IDE, compiler, and/or runtime.

In an embodiment, the system resolves module dependencies between the modules in the module system (Operation 904). Identifying modules in the module system (Operation 902) may involve resolving module dependencies (Operation 904). To resolve module dependencies, the system may generate a dependency graph of the modules. The system may start from a main module and generate a dependency graph based on explicitly declared dependencies (e.g. using "requires" clauses). A separation of two or more edges between modules in the dependency graph indicates an indirect dependency. The system may resolve module dependencies prior to or during runtime. Prior to runtime, the system may resolve module dependencies using an IDE and/or compiler. In an IDE, the system may generate a dependency graph starting from a module that is currently displayed in a GUI. The system may resolve dependencies for all the modules in the module system or a subset thereof.

In an embodiment, the system identifies a target module (Operation 906). For purposes of this discussion, a "target" module is a module that is "targeted" by a reference from another module and/or non-module code. In an example, if a dependency graph is used, a module that is "targeted" by an edge in the graph is considered a target module. A module at the other end of the edge may be referred to as a "reading" module, because it "reads" the targeted module.

In an embodiment, the system determines whether the module is deprecated (Operation 908). Determining whether a module is deprecated is discussed in further detail below. A module that is not explicitly deprecated may nonetheless be considered deprecated if it depends, directly or indirectly, on another module that is explicitly deprecated. If the module is not deprecated, then the system may determine whether there is another target module to analyze (Operation 920). For example, the system may determine whether it has analyzed all the modules in a dependency graph. If there is another target module to analyze, then the system proceeds to identify the target module (Operation 906). If there is not another target module to analyze, then the method ends (Operation 922).

In an embodiment, if the module is deprecated, then the system determines the kind of deprecation of the module (Operation 910). Determining the kind of deprecation of a module is discussed in further detail above.

In an embodiment, the system determines a referenced type in the module (Operation 912). Specifically, the system determines a type in the deprecated module that is referenced by code in another module (e.g., a consuming module). Determining a type in the deprecated module that is referenced by another module may be performed using a dependency graph. When a dependency graph is used, code in another module may reference a type in the deprecated module only if the other module depends, indirectly or indirectly, on the deprecated module. Indirect dependencies may involve multiple levels of indirection. A dependency graph, when available, is an efficient tool for identifying such dependencies.

In an embodiment, the system analyzes each referenced type in a module one-by-one. Alternatively, the system may generate a set of referenced types in a module before analyzing the set. The system may analyze each set, for each module, one-by-one. Alternatively, the system may generate a set of all the referenced types in all the identified modules, and then analyze the references in the full set. For each referenced type, the system may also determine a kind of the reference to the type (Operation 914). As discussed above, there may be many different kinds of references to types.

In an embodiment, the system presents information indicating a reference to a type exposed by a deprecated module (Operation 916). The system may present many different kinds of information. The information presented may include information about the type and/or the module. In an example, a reference at line 20 of module source code is to a type "T" exposed by a deprecated module "M." The system may present a warning such as "Warning: line 20 references type T in deprecated module M." Alternatively, in this example, the system may present a less detailed warning such as "Warning: line 20 references a type exposed by a deprecated module." The system may present more or less detailed information. Information that the system presents may include the line(s) of code that reference the type, the type itself, the module that includes the type, the kind of deprecation of the module, the kind of reference to the type, a suggestion for modifying the code, a hyperlink to additional information (e.g., a help page) and/or any other kind of information relevant to a reference to a type exposed by a deprecated module. If the reference is from code in a module, the information presented may include information about the module that includes the reference. The information presented may include the module identity, information about a dependency path between the module and the deprecated module, and/or any other kind of information relevant to a reference from module code to a type exposed by a deprecated module.

In an embodiment, operations described above allow a system to infer that non-module and/or module code is deprecated, based on a reference to a type exposed by a deprecated module. The reference may be a direct reference or an indirect reference. Presenting information about a reference a type exposed by a deprecated module may alert one or more developers of code that references the type. Based on the information presented, the developer(s) may modify the code to eliminate the reference. If the module is terminally deprecated, modifying the code may prevent the code from becoming degraded, unrealiable, and/or inoperable if the module is removed from the system in a later version.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another kind of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding kind of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   detecting a reference to a type by non-module code or code within a first module that is not explicitly deprecated;
   determining that a second module is associated with a particular deprecation status and exposes the type referenced by the non-module code or code within the first module that is not explicitly deprecated;
   responsive to determining that the second module is associated with the particular deprecation status and exposes the type referenced by the non-module code or code within the first module that is not explicitly deprecated:
      determining a kind of deprecation associated with the particular deprecation status of the second module;
      based at least in part on the kind of deprecation associated with the particular deprecation status of the second module, inferring (a) that the non-module code or first module is deprecated and (b) a severity of deprecation associated with the non-module code or first module; and
      presenting a warning, at compile-time or runtime, for the non-module code or first module indicating that the type referenced by the non-module code or code within the first module is exposed by a deprecated module, wherein the warning for the non-module code or first module includes information based at least in part on the kind of deprecation associated with the particular deprecation status of the second module and the severity of deprecation inferred for the non-module code or first module.

2. The medium of claim 1, the operations further comprising inferring that an application programming interface signature of the non-module code is deprecated responsive to determining that the second module is associated with the particular deprecation status and exposes the type referenced by the non-module code or code within the first module that is not deprecated.

3. The medium of claim 1, wherein the reference to the type comprises an indirect reference, via at least one other type, to the type that is exposed by the second module.

4. The medium of claim 3, the operations further comprising:
   traversing a module dependency graph to identify the indirect reference.

5. The medium of claim 1, wherein the first module depends indirectly on the second module.

6. The medium of claim 1, wherein the particular deprecation status is terminal deprecation; wherein references to types exposed by ordinarily deprecated modules are ignored.

7. The medium of claim 1, the operations further comprising:
   determining that the reference to the type is associated with an application programming interface (API) signature; and
   based at least in part on the reference to the type being associated with the API signature, increasing a level of severity for the warning.

8. A method comprising:
   detecting a reference to a type by non-module code or code within a first module that is not explicitly deprecated;
   determining that a second module is associated with a particular deprecation status and exposes the type referenced by the non-module code or code within the first module that is not explicitly deprecated;
   responsive to determining that the second module is associated with the particular deprecation status and exposes the type referenced by the non-module code or code within the first module that is not explicitly deprecated:
      determining a kind of deprecation associated with the particular deprecation status of the second module;
      based at least in part on the kind of deprecation associated with the particular deprecation status of the second module, inferring (a) that the non-module code or first module is deprecated and (b) a severity of deprecation associated with the non-module code or first module; and
      presenting a warning, at compile-time or runtime, for the non-module code or first module indicating that the type referenced by the non-module code or code within the first module is exposed by a deprecated module, wherein the warning for the non-module code or first module includes information based at least in part on the kind of deprecation associated with the particular deprecation status of the second module and the severity of deprecation inferred for the non-module code or first module.

9. The method of claim 8, further comprising inferring that an application programming interface signature of the non-module code is deprecated responsive to determining that the second module is associated with the particular deprecation status and exposes the type referenced by the non-module code or code within the first module that is not deprecated.

10. The method of claim 8, wherein the reference to the type comprises an indirect reference, via at least one other type, to the type that is exposed by the second module.

11. The method of claim 10, further comprising:
traversing a module dependency graph to identify the indirect reference.

12. The method of claim 8, wherein the first module depends indirectly on the second module.

13. The method of claim 8, wherein the particular deprecation status is terminal deprecation; wherein references to types exposed by ordinarily deprecated modules are ignored.

14. The method of claim 8, further comprising:
determining that the reference to the type is associated with an application programming interface (API) signature; and
based at least in part on the reference to the type being associated with the API signature, increasing a level of severity for the warning.

15. A system comprising:
one or more hardware processors; and
one or more non-transitory computer-readable media storing instructions, which when executed by the one or more hardware processors, cause execution of operations comprising:
detecting a reference to a type by non-module code or code within a first module that is not explicitly deprecated;
determining that a second module is associated with a particular deprecation status and exposes the type referenced by the non-module code or code within the first module that is not explicitly deprecated;
responsive to determining that the second module is associated with the particular deprecation status and exposes the type referenced by the non-module code or code within the first module that is not explicitly deprecated:
determining a kind of deprecation associated with the particular deprecation status of the second module;
based at least in part on the kind of deprecation associated with the particular deprecation status of the second module, inferring (a) that the non-module code or first module is deprecated and (b) a severity of deprecation associated with the non-module code or first module; and
presenting a warning, at compile-time or runtime, for the non-module code or first module indicating that the type referenced by the non-module code or code within the first module is exposed by a deprecated module, wherein the warning for the non-module code or first module includes information based at least in part on the kind of deprecation associated with the particular deprecation status of the second module and the severity of deprecation inferred for the non-module code or first module.

16. The system of claim 15, the operations further comprising:
inferring that an application programming interface signature of the non-module code is deprecated responsive to determining that the second module is associated with the particular deprecation status and exposes the type referenced by the non-module code or code within the first module that is not deprecated.

17. The system of claim 15, wherein the reference to the type comprises an indirect reference, via at least one other type, to the type that is exposed by the second module.

18. The system of claim 15, wherein the first module depends indirectly on the second module.

19. The system of claim 15, wherein the particular deprecation status is terminal deprecation; wherein references to types exposed by ordinarily deprecated modules are ignored.

20. The system of claim 1, the operations further comprising:
determining that the reference to the type is associated with an application programming interface (API) signature; and
based at least in part on the reference to the type being associated with the API signature, increasing a level of severity for the warning.

* * * * *

UNITED STATES PATENT AND TRADEMARK OFFICE
CERTIFICATE OF CORRECTION

PATENT NO. : 11,366,657 B2
APPLICATION NO. : 16/856377
DATED : June 21, 2022
INVENTOR(S) : Hegarty et al.

It is certified that error appears in the above-identified patent and that said Letters Patent is hereby corrected as shown below:

In the Specification

In Column 3, Line 7, delete "constructed" and insert -- construed --, therefor.

In Column 17, Line 3, delete "that that" and insert -- that --, therefor.

In Column 20, Line 20, delete "unrealiable," and insert -- unreliable, --, therefor.

In the Claims

In Column 30, Line 36, in Claim 20, delete "1," and insert -- 15, --, therefor.

Signed and Sealed this
Sixth Day of December, 2022

Katherine Kelly Vidal
*Director of the United States Patent and Trademark Office*